United States Patent
Brown et al.

(10) Patent No.: US 11,499,558 B2
(45) Date of Patent: Nov. 15, 2022

(54) SUBMERSIBLE PUMP WITH BARRIER FLUID ISOLATION OF MOTOR LUBRICATING LIQUID FROM PUMPED PRODUCT

(71) Applicant: Flowserve Management Company, Irving, TX (US)

(72) Inventors: John L. Brown, Gettysburg, PA (US); Sean A. Cain, Tulsa, OK (US)

(73) Assignee: Flowserve Management Company, Irving, TX (US)

( * ) Notice: Subject to any disclaimer, the term of this patent is extended or adjusted under 35 U.S.C. 154(b) by 73 days.

(21) Appl. No.: 17/217,576

(22) Filed: Mar. 30, 2021

(65) Prior Publication Data
US 2022/0316465 A1  Oct. 6, 2022

(51) Int. Cl.
*F04D 13/06* (2006.01)
*E21B 43/12* (2006.01)
(Continued)

(52) U.S. Cl.
CPC .......... *F04D 13/062* (2013.01); *E21B 43/128* (2013.01); *F04B 43/04* (2013.01); *F04B 47/00* (2013.01); *F04B 53/18* (2013.01); *F04D 13/10* (2013.01); *F04D 15/0218* (2013.01); *F04D 29/106* (2013.01); *H02K 5/132* (2013.01); *F04B 15/00* (2013.01)

(58) Field of Classification Search
CPC .... F04D 13/062; F04D 13/10; F04D 15/0218; F04D 15/00; F04D 27/004; F04D 29/106; H02K 5/132
USPC ....................................................... 417/414
See application file for complete search history.

(56) References Cited

U.S. PATENT DOCUMENTS 2,020,513 A    11/1935  Mendenhall
2,427,656 A     9/1947  Blom
(Continued)

FOREIGN PATENT DOCUMENTS

FR     2303402 A1    10/1976

OTHER PUBLICATIONS

"DuraClear Crystal 7: High Performance Synthetic Barrier Fluid", Flowserve Corporation, 2 Pages, 2016.
(Continued)

*Primary Examiner* — Charles G Freay
(74) *Attorney, Agent, or Firm* — Maine Cernota & Rardin

(57) ABSTRACT

An electrical submersible pump (ESP) isolates its motor lubricant from pumped product without requiring a bellows, diaphragm, bladder, or external lubricant pressurizing system. A pair of nested isolation chambers below the motor housing are filled with a barrier fluid that is non-reactive, non-miscible, and higher in density than the pumped product and the motor lubricant. As the motor lubricant expands and contracts after pump start-up and shut-down, motor lubricant and barrier fluid are exchanged between the motor housing and the isolation chambers via three interconnections, while pumped product is exchanged with the inner barrier chamber, while being isolated from the motor housing. The interconnections extend between the bottom of the motor housing and the bottom of the outer barrier chamber, between the top of the outer barrier chamber and the bottom of the inner barrier chamber, and between the top of the inner barrier chamber and the pumped product.

12 Claims, 8 Drawing Sheets

(51) Int. Cl.

| | |
|---|---|
| *F04B 43/04* | (2006.01) |
| *F04B 47/00* | (2006.01) |
| *F04B 53/18* | (2006.01) |
| *F04D 29/10* | (2006.01) |
| *F04D 13/10* | (2006.01) |
| *H02K 5/132* | (2006.01) |
| *F04D 15/02* | (2006.01) |
| *F04B 15/00* | (2006.01) |

(56) References Cited

U.S. PATENT DOCUMENTS

| | | | |
|---|---|---|---|
| 2,446,521 A * | 8/1948 | Blom | H02K 5/132 |
| | | | 310/85 |
| 8,641,389 B2 * | 2/2014 | McKinney | E21B 43/128 |
| | | | 417/423.3 |
| 2002/0192090 A1 * | 12/2002 | Du | F04D 13/062 |
| | | | 417/423.11 |
| 2011/0236233 A1 * | 9/2011 | Merill | F04B 17/03 |
| | | | 417/410.1 |
| 2020/0095992 A1 | 3/2020 | Semple et al. | |

OTHER PUBLICATIONS

Extended European Search Report for EP Patent Appl. No. 22164472.7-1004 dated Aug. 22, 2022, 10 Pages.

\* cited by examiner

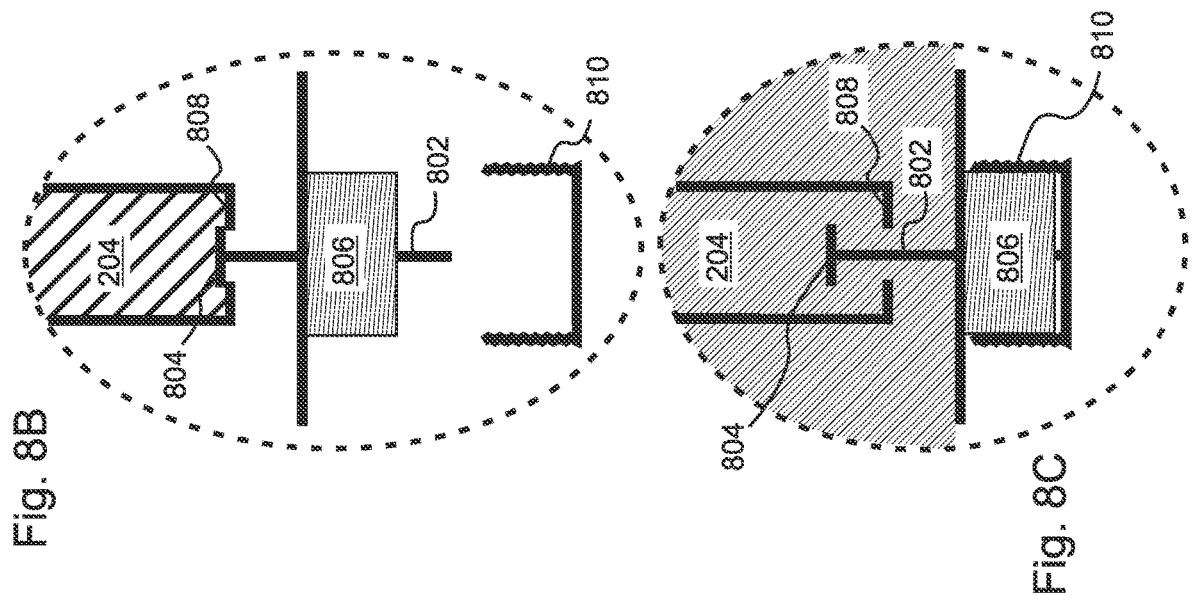
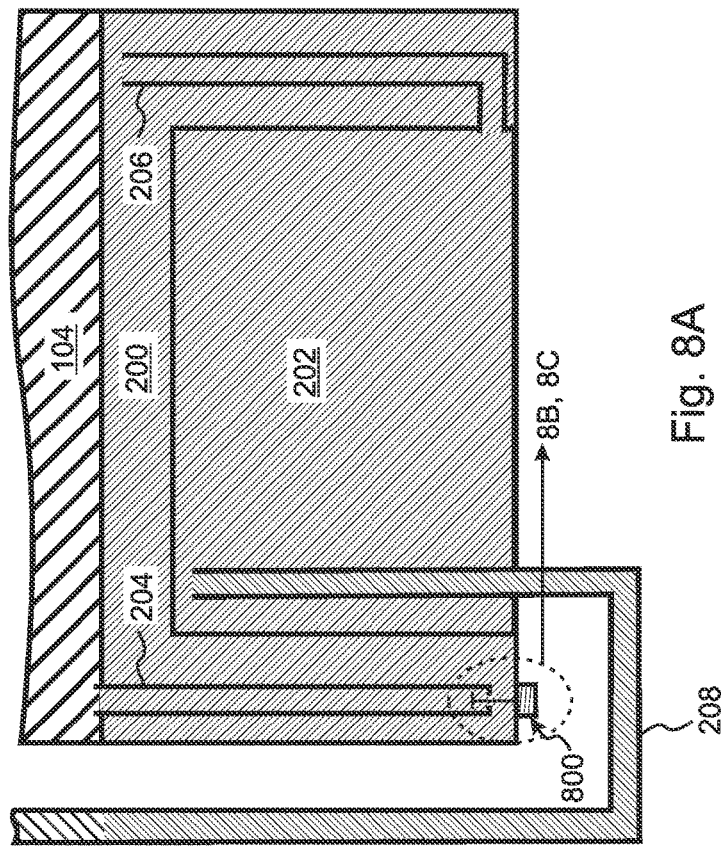

SUBMERSIBLE PUMP WITH BARRIER FLUID ISOLATION OF MOTOR LUBRICATING LIQUID FROM PUMPED PRODUCT

FIELD OF THE INVENTION

The invention relates to submersible pumps, and more particularly, to electrical submersible pumps that require isolation of a motor lubricant from a liquid pumped product.

BACKGROUND OF THE INVENTION

Electrical submersible pumps (ESPs) are commonly used to pump liquids from sumps or wells. Applications include pumping water from sumps and water wells, pumping sea water, and pumping crude oil and other hydrocarbons from hydrocarbon producing wells. An ESP includes a pump interconnected by a rotating shaft with an electrical motor contained within a motor housing that is filled with a motor lubricant, which is typically either water or a lubricating oil. An ESP further includes a seal chamber located between the motor housing and the pump within which a shaft seal, such as an end face mechanical seal, prevents leakage of the pumped product into the motor housing along the rotating shaft. Due to changes in temperature, the motor lubricant will expand during operation, and then contract when the pump is not running. This expansion and contraction must be accommodated by the pump design.

ESPs often use a bellows, diaphragm, or bladder (generically referred to herein as a diaphragm) to accommodate the expansion and contraction of the motor lubricant while keeping the motor lubricant separated from the pumped product. When an ESP having a water-lubricated motor is used to pump fresh water, then a small amount of leakage between the lubricating water and the pumped water can be tolerated.

Similarly, when an ESP having an oil-lubricated motor is used to pump water, then some leakage of the water past the diaphragm can often be tolerated, due to the higher density of the water as compared to the lubricating oil. This is because any water that leaks past the diaphragm during contraction of the lubricating oil will remain at the bottom of the motor cavity, and will be expelled again when the lubricating oil re-expands. In fact, it is often possible to omit the diaphragm entirely for an oil-lubricated ESP that is used to pump water, so long as ample space is provided in the motor cavity below the motor to accommodate the full influx of water during contraction of the lubricating oil. This approach can be desirable, because omitting a diaphragm reduces the complexity and cost of the pump, and also improves the reliability of the design. However, concerns may arise regarding possible leakage of the oil lubricant into the pumped water. For example, it is important that pumped drinking water be free of hydrocarbons, and it is environmentally harmful if an oil lubricant leaks into the ocean.

An example of an ESP having an oil-lubricated motor is presented in FIG. 1. The ESP is surrounded by an ESP housing 124, and includes a motor 100 within a motor housing 102 that is filled with a motor lubricant 104, which in FIG. 1 is a lubricating oil 104, as well as a seal chamber 106 containing a pair of end face mechanical seals 108. The pump 110 in FIG. 1 is used to pump water 112. Instead of a bellows, diaphragm, or bladder, the ESP of FIG. 1 provides a space 114 within the motor housing 102 below the motor 100 that is interconnected with the pumped water 112. Due to the density difference between water and oil, water that enters the motor housing 102 due to contraction of the lubricating oil 104 remains at the bottom 114 of the motor housing 102, and does not contact the electrical and mechanical wearing components of the motor 100. When the lubricating oil 104 re-expands, the water is expelled from the lower portion 114 of the motor housing 102. The ESP of FIG. 1 further includes an interconnection 116 between the oil-filled seal chamber 106 and the motor housing 102 which ensures that the oil pressures of the two chambers 102, 106 remains equalized. The illustrated example includes an interconnection 120 between the pump housing 110 and the lower region 114 of the motor housing 102. Similar designs interconnect the lower region 114 of the motor housing 102 with the fluid in the well 122 that surrounds the pump housing 110. For simplicity of illustration, the bearings that mechanically support the rotating shaft 118 are not shown in FIG. 1.

While some pump applications may be able to tolerate some leakage of pumped product into the motor housing, the problem of lubricant isolation can be more critical in other applications, for example when an ESP having an oil-lubricated pump is used to pump a hydrocarbon, or when an ESP having a water-lubricated pump is used to pump hydrocarbons or saltwater. If the pumped product and the motor lubricant have similar densities, then any pumped product that leaks into the interior of the motor housing will be disbursed throughout the chamber, and may contaminate and degrade the motor. Similarly, if the density of the pumped product is less than the density of the motor lubricant, then any pumped product that leaks into the interior of the motor housing will rise to the top of the motor housing, and may thereby come into contact with the motor.

One approach is to include a highly efficient and sophisticated bellows, diaphragm, and/or bladder system to separate the motor lubricant from the pumped product. Also, or in addition, the ESP may include an external lubricant pressurization system that maintains the motor lubricant at a pressure that is higher than the pumped product, so that any leakage will always be from the motor housing into the pumped product, and not vice versa. However, these approaches necessarily add cost and complexity to the ESP, and reduce the reliability of the ESP by adding additional components that may fail and require repair.

What is needed, therefore, is an electrical submerged pump (ESP) that maintains a separation between the motor lubricant and the pumped product even when the density of the pumped product is similar to or less than the density of the motor lubricant, without requiring that a bellows, diaphragm, or bladder be used to separate the motor lubricant from the pumped hydrocarbons, and without any need for an external lubricant pressurizing system.

SUMMARY OF THE INVENTION

The present invention is an electrical submerged pump (ESP) that maintains a separation between the motor lubricant and the pumped product even when the density of the pumped product is similar to or less than the density of the motor lubricant, without requiring that a bellows, diaphragm, or bladder be used to separate the motor lubricant from the pumped hydrocarbons, and without any need for an external lubricant pressurizing system.

According to the present invention a pair of nested isolation chambers are located within the ESP below the motor housing, and are filled with a barrier liquid (referred to herein as the barrier fluid) that does not react with, nor mix with, the pumped product or the motor lubricant, and that has a significantly higher density than the pumped product and the motor lubricant. As the lubricating liquid expands after pump start-up and contracts after pump shutdown, motor lubricant and barrier fluid are exchanged between the motor housing and the two isolation chambers. At the same time, pumped product is exchanged between the pump housing and the inner barrier chamber. However, due to the lower densities of the motor lubricant and the pumped product as compared to the barrier fluid, a separation is maintained between the pumped product and the motor lubricant. In particular, the pumped product is not able to reach the outer barrier chamber, and hence is not able to reach the motor housing. And in embodiments, after the first startup and shut down of the ESP, the motor lubricant is unable to reach the inner barrier chamber, and is therefore isolated from the pumped product According to the present invention, three interconnections are provided that allow liquids to be exchanged between the motor housing, the two barrier chambers, and the pumped product. The first interconnection is between the bottom of the motor housing and the bottom of the outer barrier chamber. The second interconnection is between the top of the outer barrier chamber and the bottom of the inner barrier chamber. And the third interconnection is between the top of the inner barrier chamber and a space outside of the motor housing and barrier chambers that is filled with the pumped product. These three interconnections ensure that the pressures will remain equalized between the motor housing interior, the two barrier chambers, and the pumped product.

In some embodiments, the seal chamber is also filled with the barrier fluid, and a fourth interconnection extends from the seal chamber to the bottom of the inner barrier chamber, thereby maintaining the seal chamber at the same pressure as the other chambers.

Embodiments include a first interconnection valve incorporated into the first interconnection. Before the barrier fluid is added to the ESP, the first interconnection valve isolates the interior of the motor housing, which is filled with motor lubricant, from the barrier chambers, which may initially be empty, or may be filled with an oil. Drain vents are temporarily opened to allow any contents to be drained from the barrier chambers, after which the barrier chambers are filled with barrier fluid. Once the barrier chambers have been filled, the first interconnection valve is opened, and remains open during operation of the ESP. In embodiments that include a fourth interconnection between the seal chamber and the inner barrier chamber, the seal chamber is drained and then filled with barrier fluid together with the seal chambers.

It should be noted that the disclosed ESP is suitable for pumping any liquid pumped product while using any motor lubricant, so long as the barrier fluid is not miscible nor reactive with the pumped product or motor lubricant, and so long as the densities of the pumped product and the motor lubricant are less than the density of the barrier fluid.

One general aspect of the present invention is an electrical submerged pump (ESP) suitable for pumping a pumped product while isolating the pumped product from motor lubrication contained in a motor housing within the ESP, said isolating being without implementation of a bellows, diaphragm, or bladder. The ESP includes a pump comprising a pump impellor contained within a pump housing, an electrical motor, a motor housing surrounding the electrical motor, the motor housing containing a motor lubricant, a lower region of the motor housing extending below the electrical motor, a rotatable shaft extending from the electrical motor to the pump, a seal configured to prevent a pumped product from leaking into the motor housing along the rotatable shaft, a seal housing surrounding the seal, an outer barrier chamber located below the motor housing, an inner barrier chamber nested within the outer barrier chamber, an ESP housing surrounding the pump, the motor housing, and the barrier chambers, a first interconnection configured to enable liquid communication between the lower region of the motor housing and a lower region of the outer barrier chamber, a second interconnection configured to enable liquid communication between an upper region of the outer barrier chamber and a lower region of the inner barrier chamber, a third interconnection configured to provide liquid communication between an upper region of the inner barrier chamber and a product location within the ESP housing, the product location being filled with the pumped product, and a barrier fluid included within the outer and inner barrier chambers, the barrier fluid being immiscible and non-reactive with the motor lubricant and the pumped product, and having a barrier fluid density that is higher than a density of the motor lubricant and a density of the pumped product.

In embodiments, the pumped product includes at least one hydrocarbon. And in some of these embodiments the pumped product is crude oil.

In any of the above embodiments, the pumped product can be water. In some of these embodiments, the pumped product is salt water.

In any of the above embodiments, the seal chamber can be filled with the barrier fluid, and the ESP can further comprises a fourth interconnection configured to provide fluid communication between the seal chamber and the lower region of the inner barrier chamber.

In any of the above embodiments, the product location can be an intake region of the pump housing, a location within the ESP housing, but exterior to the pump housing, seal housing, motor housing, and barrier chambers, or a location exterior to the ESP housing.

Any of the above embodiments can further include a first interconnection valve coordinate with the first interconnection and configured to be closed prior to installation of the ESP, and to remain open following the installation of the ESP.

A second general aspect of the present invention is a method of pumping a pumped product while isolating the pumped product from a motor lubricant contained in a motor housing, said isolating being without implementation of a bellows, diaphragm, or bladder. The method includes providing an ESP according to any embodiment of the first general aspect, filling the outer and inner barrier chambers with the barrier fluid, said barrier fluid being immiscible and non-reactive with the motor lubricant and with the pumped product, and having a having a barrier fluid density that is higher than a density of the motor lubricant and a density of the pumped product, operating the motor, thereby causing the motor lubricant within the motor housing to expand, so that some of the motor lubricant is caused to enter the lower region of the outer barrier chamber through the first interconnection, and from thence to float to the upper region of the outer barrier chamber, said motor lubricant being further caused to enter the lower region of the inner barrier chamber through the second interconnection, and from thence to float to the upper region of the inner barrier chamber, said motor lubricant being further caused to enter the third interconnection, stopping the motor, thereby causing the motor lubricant in the motor housing to contract, so that some of the barrier fluid enters the lower region of the motor housing through the first interconnection, while at least one of motor lubricant and pumped product are caused to flow through the third interconnection and into the upper region of the inner barrier chamber, and restarting the motor, thereby causing the motor lubricant in the motor housing to expand, so that at least some of the barrier fluid that previously entered into the lower region of the motor housing is caused to flow through the first interconnection into the outer barrier chamber, while at least one of motor lubricant and barrier fluid are caused to enter the third interconnection from the inner barrier chamber.

In embodiments, the ESP further includes a first interconnection valve cooperative with the first interconnection, and the method further includes causing the first interconnection valve to be closed before filling the outer and inner buffer chambers with the barrier fluid, thereby maintaining the motor lubricant within the motor housing, and opening the first interconnection valve after filling the outer and inner buffer chambers with the barrier fluid, and before operating the motor.

In any of the above embodiments, the ESP can further include a fourth interconnection configured to provide fluid communication between the seal housing and the lower region of the inner barrier chamber, and the method further comprises filling the seal housing with the barrier fluid.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 8A is a cross-sectional side view of the motor housing and barrier chambers of an embodiment that includes a valve coordinate with the first interconnection;

FIG. 8B is a cross sectional view of the valve of FIG. 8A, shown before filling of the barrier chambers with barrier fluid; and FIG. 8C is a cross-sectional view of the valve of FIG. 8B, shown after filling of the barrier chambers with barrier fluid.

DETAILED DESCRIPTION

The present invention is an electrical submerged pump (ESP) that maintains a separation between the motor lubricant and the pumped product even when the density of the pumped product is similar to or less than the density of the motor lubricant, without requiring that a bellows, diaphragm, or bladder be used to separate the motor lubricant from the pumped hydrocarbons, and without any need for an external motor lubricant pressurizing system.

Figure 1:
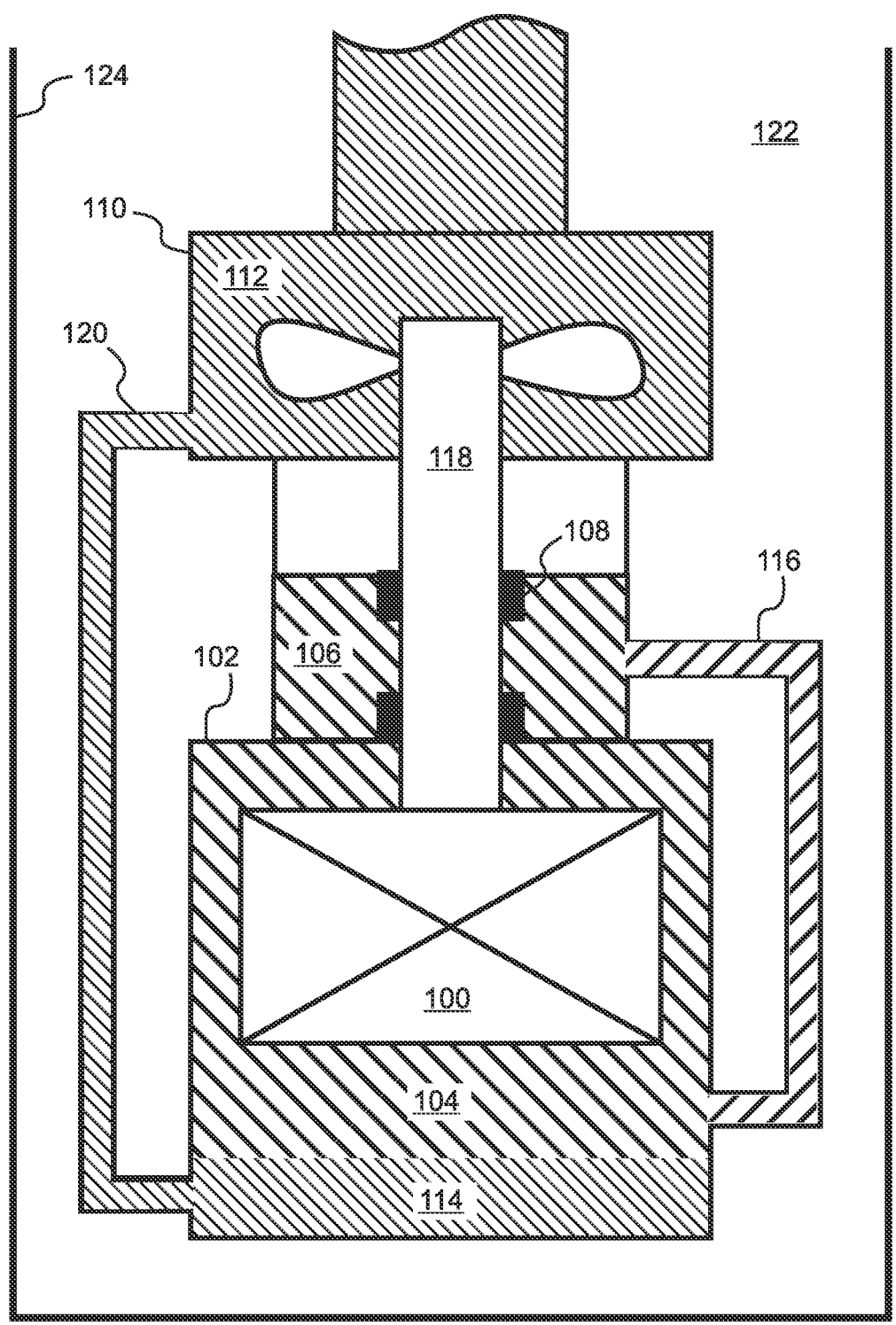
FIG. 1 is a cross-sectional side view of an oil lubricated electrical submersible pump (ESP) configured for pumping water according to the prior art.
Figure 2:
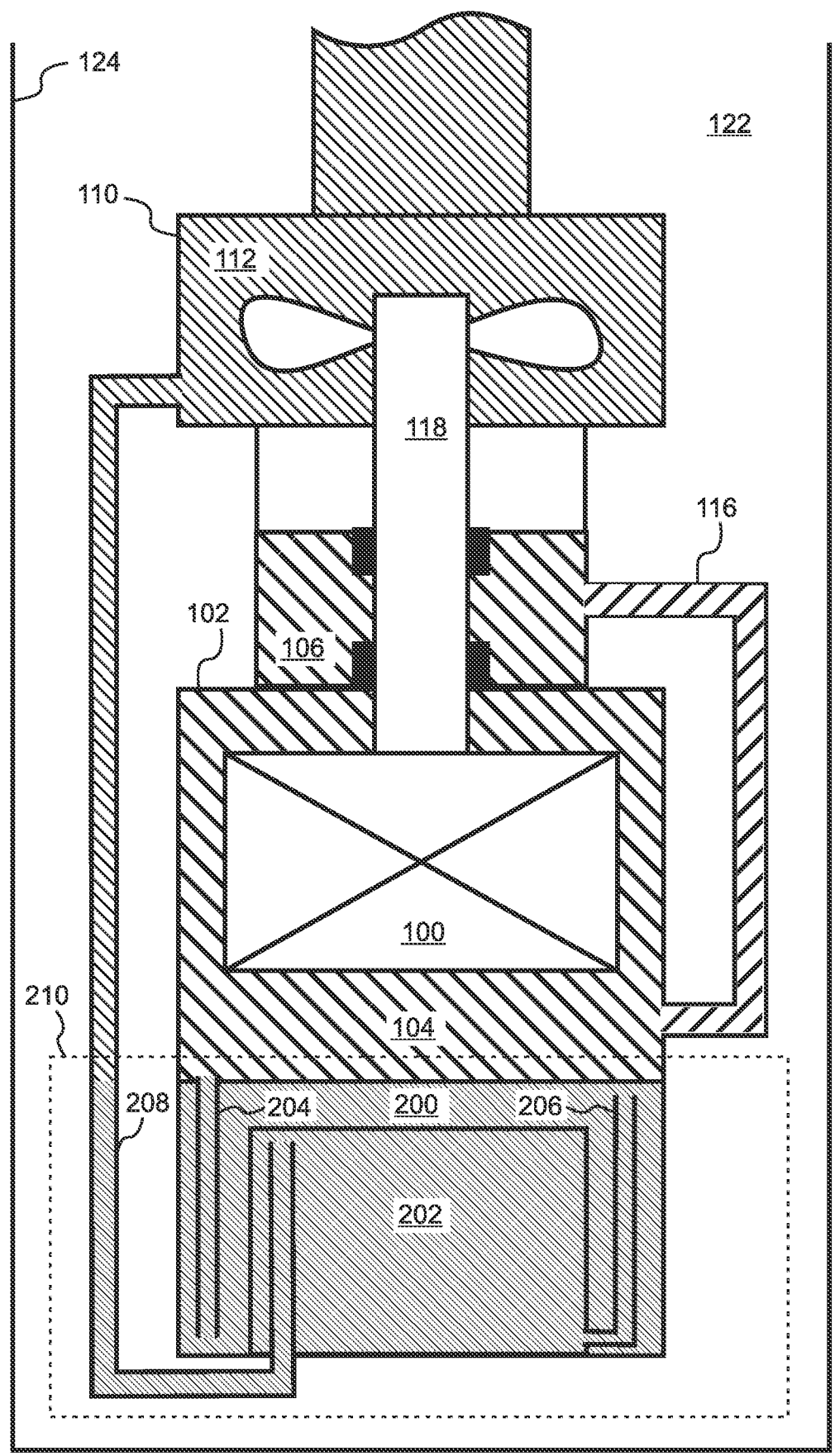
FIG. 2 is a cross-sectional side view of an ESP according to an embodiment of the present invention.

With reference to FIG. 2, according to the present invention a pair of nested isolation chambers 200, 202 are provided within the ESP below the motor housing 102, and are initially filled with a barrier liquid (dense cross-hatching), referred to herein as the barrier fluid. The barrier fluid does not react with, nor mix with, the pumped product 112 or motor lubricant 104, and has a significantly higher density than the pumped product 112 and the motor lubricant.

Three interconnections 204, 206, 208 are provided that allow liquids to be exchanged between the motor housing 102, the two barrier chambers 200, 202, and a "product region" outside of the motor housing and barrier chambers that contains pumped product. For example, the product region can be the intake of the pump 110, a region 122 within the ESP housing 124 exterior to the pump, motor housings, and barrier chambers, or a region exterior to the ESP housing 124. As can be seen in FIG. 2, the first interconnection 204 is between the bottom of the motor housing 102 and the bottom of the outer barrier chamber 200. The second interconnection 206 is between the top of the outer barrier chamber 200 and the bottom of the inner barrier chamber 202. And the third interconnection 208 is between the top of the inner barrier chamber 202 and the intake of the pump 110. These interconnections 204, 206, 208 ensure that the pressures remain equalized between the motor lubricant 104, the two barrier chambers 200, 202, and the product region.

FIG. 2 illustrates the configuration of the illustrated embodiment immediately after initial installation, and before startup of the ESP. In this configuration, both of the barrier chambers 200, 202 are filled with the barrier fluid. The third interconnection 208 is also filled with the barrier fluid up to a level that is even with the top of the outer barrier chamber 200.

Figure 3:
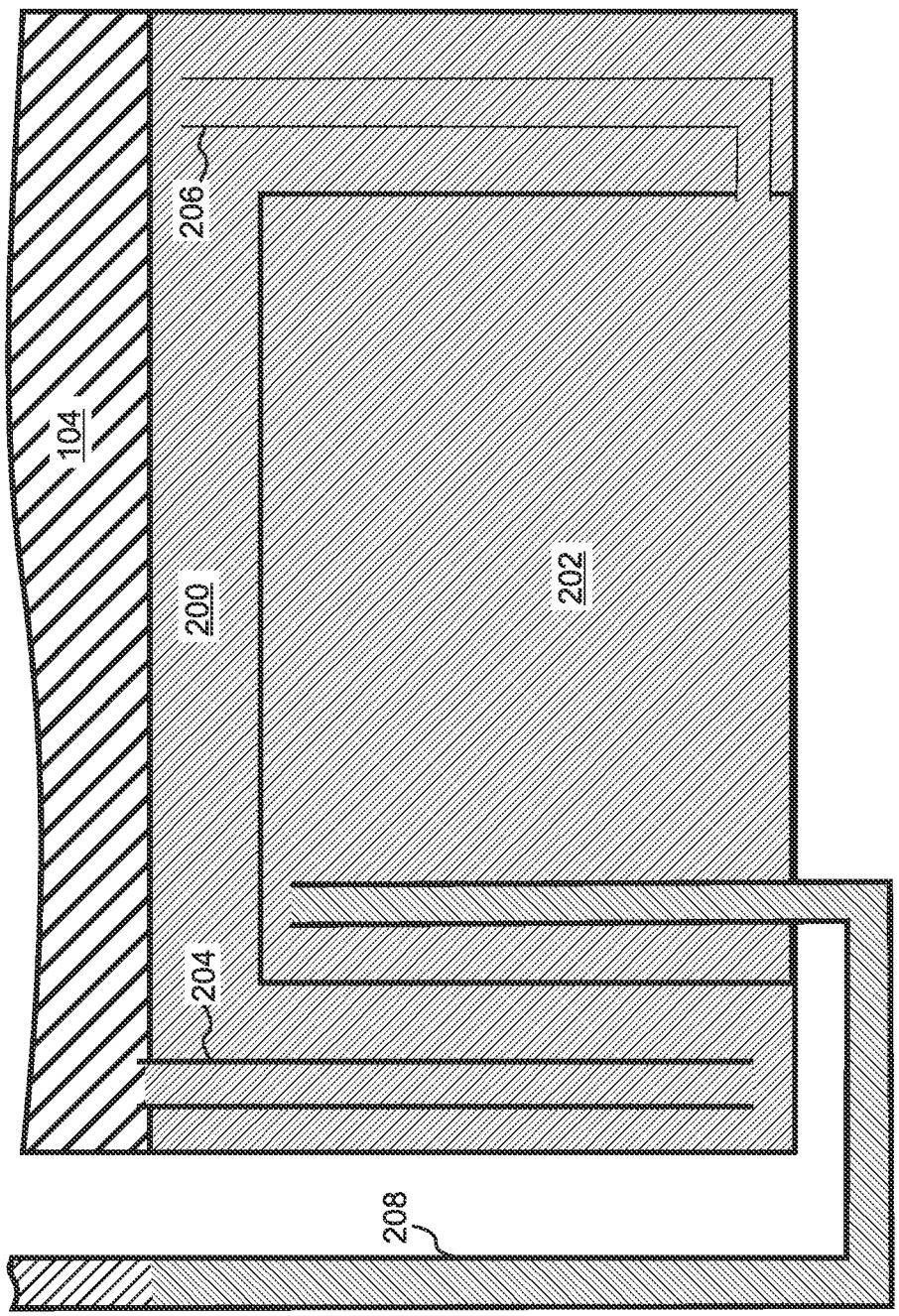
FIG. 3 is a cross-sectional side view of the motor housing and barrier chambers of FIG. 2, shown before initial operation of the ESP.

FIG. 3 is a close-up view of the region of FIG. 2 that is surrounded by the dashed rectangle 210. This is the region that is illustrated in all of FIGS. 3-6. The configuration of FIG. 3 is otherwise the same as in FIG. 2.

Figure 4:
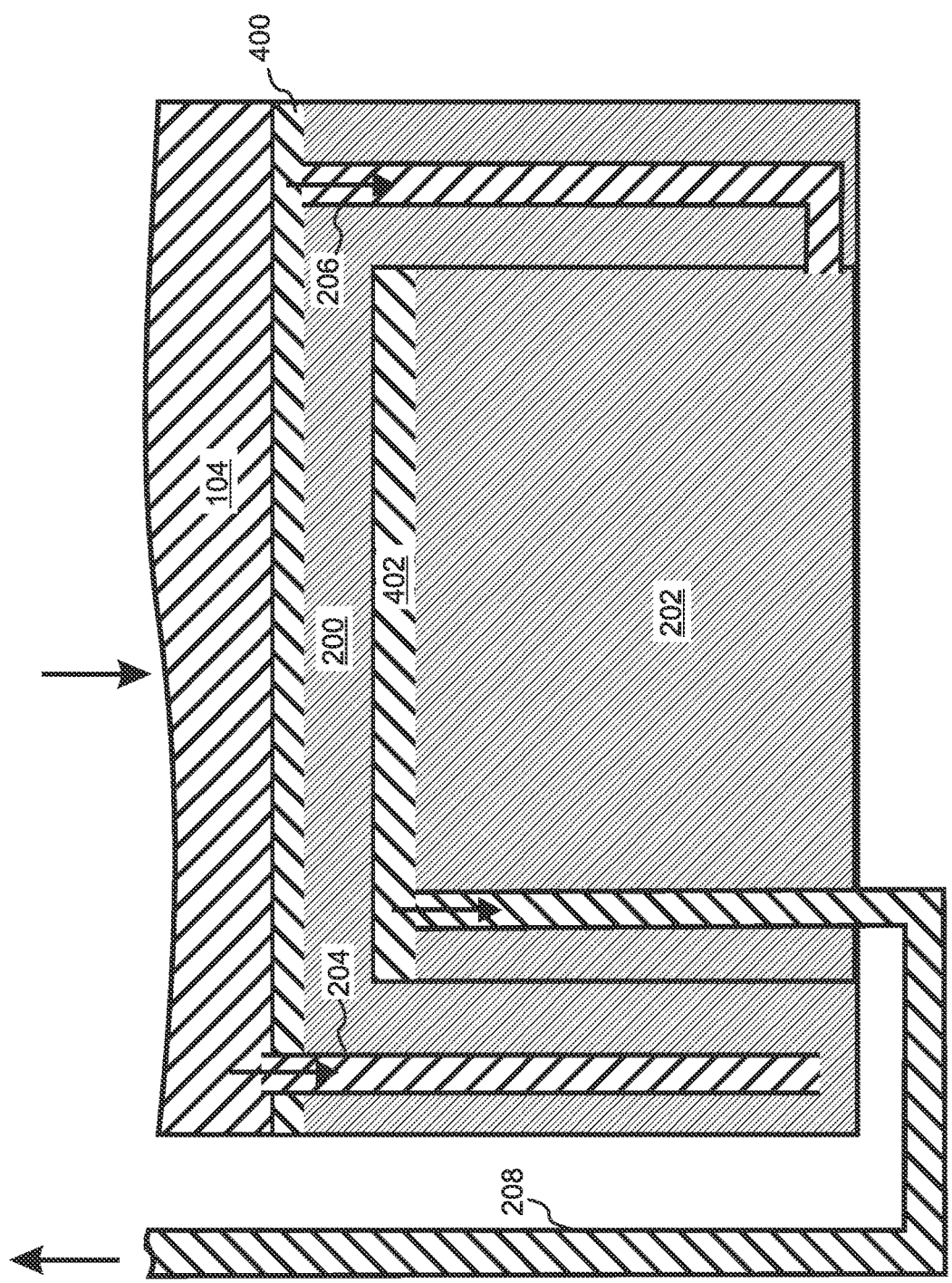
FIG. 4 is a cross-sectional side view of the motor housing and barrier chambers of FIG. 3, shown during initial operation of the ESP.

With reference to FIG. 4, as the motor lubricant 104 expands after initial pump start-up, some of the motor lubricant 104 is pushed through the first interconnection 204 into a lower region of the outer barrier chamber 200. Since the motor lubricant 104 is not as dense as the barrier fluid, the motor lubricant that enters the outer barrier chamber 200 floats to the top of the outer barrier chamber 200 where it forms a first layer 400 of motor lubricant 104 on top of the barrier fluid. When the first layer 400 of motor lubricant 102 in the outer barrier chamber 200 becomes deep enough to reach the top of the second interconnection 206, it flows down the second interconnection 206 and into the inner barrier chamber 202, where it floats to the top and forms a second layer 402 of motor lubricant 104. And when the second layer 402 of motor lubricant 102 becomes deep enough to reach the top of the third interconnection 208, the motor lubricant 104 flows into the third interconnection 208.

Accordingly, during this initial startup of the ESP, a small amount of the motor lubricant 102 may be brought into contact with the pumped product 112. It should be noted, however, that although different crosshatching is used in the drawings to differentiate the motor lubricant 104 from the pumped product 112, in fact in some embodiments they may be of a similar density and/or miscible with each other, such that a small amount of motor lubricant 104 entering into a flow of the pumped product 112 may be acceptable.

Figure 5:
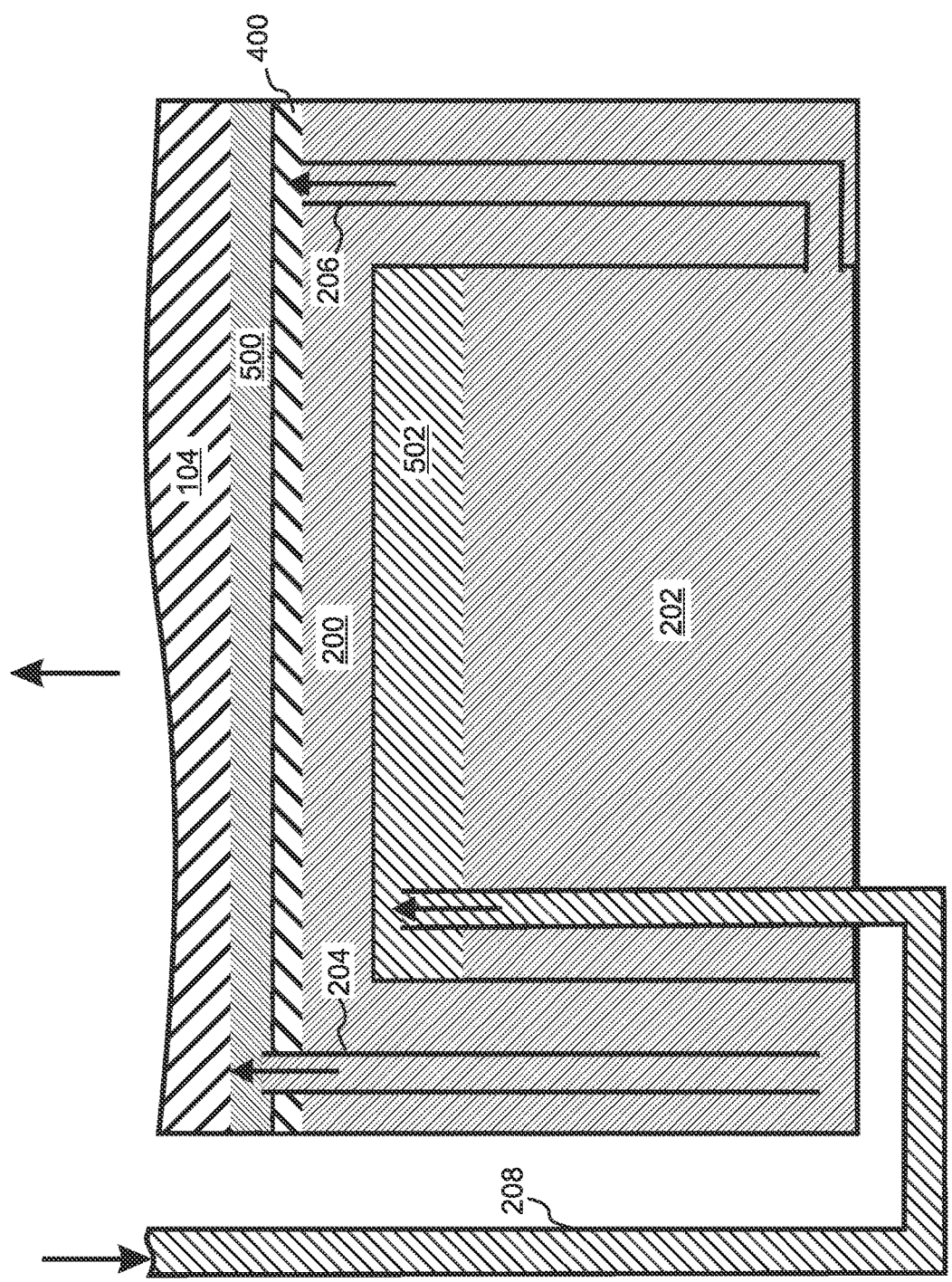
FIG. 5 is a cross-sectional side view of the motor housing and barrier chambers of FIG. 4, shown after initial operation and shut down of the ESP.

With reference to FIG. 5, when the motor lubricant 104 within the motor housing 102 contracts after a first pump shut-down, barrier fluid is drawn from the outer barrier chamber 200 through the first interconnection 204 into the motor housing 102, where it forms a layer 500 at the bottom thereof, but remains separated from the motor 100 due to its high density. The barrier fluid that is drawn out of the outer barrier chamber 200 is replenished by barrier fluid flowing from the inner barrier chamber 202 through the second interconnection 206. At the same time, any motor lubricant 104 that remains in the third interconnection 208 is drawn back through the third interconnection 208 into the inner barrier chamber 202, possibly together with some pumped product 112 drawn from the product region, where it enters the second layer 402 at the top of the inner barrier chamber 202. The first layer 400 of motor lubricant 104 at the top of the outer barrier chamber 200 remains essentially unchanged.

Figure 6:
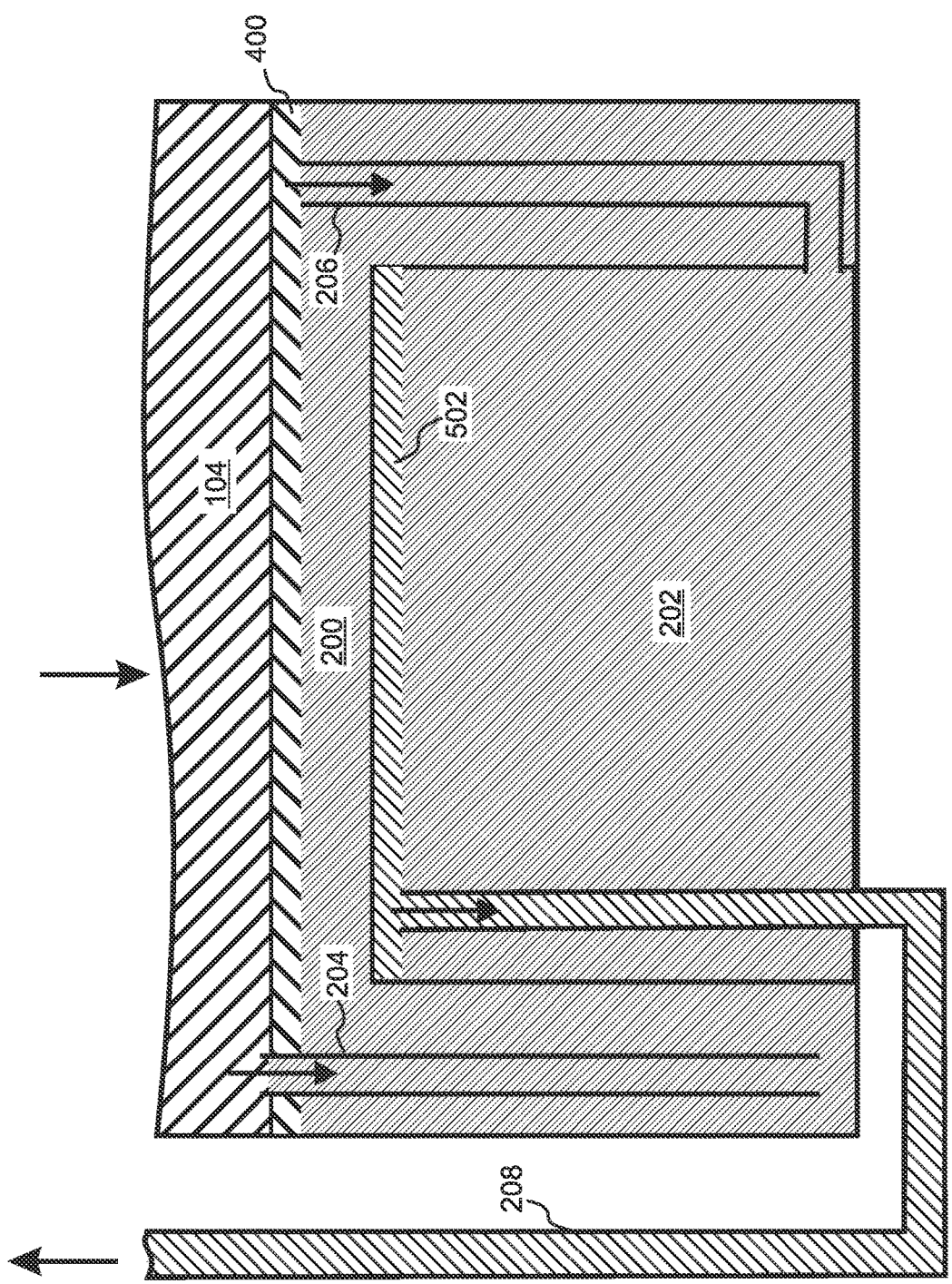
FIG. 6 is a cross-sectional side view of the motor housing and barrier chambers of FIG. 5, shown during resumed operation of the ESP.

With reference to FIG. 6, when the ESP is re-started and the motor lubricant 104 within the motor housing 102 re-expands, the layer of barrier fluid 500 that was deposited at the bottom of the motor housing 102 is expelled back into the outer barrier chamber 200 through the first interconnection 204 and from there through the second interconnection 206 into the inner barrier chamber 202, thereby expelling through the third interconnection 208 at least some of the liquid that was previously accumulated in the second layer 502 back into the third interconnection 208 and possibly into the product region. In some cases, as illustrated in FIG. 6, a residual second layer 502 of liquid may remain at the top of the inner barrier chamber 202. Once again, the first layer 400 of motor lubricant 104 at the top of the outer barrier chamber 200 remains unchanged.

Subsequent shutdowns and startups of the ESP cause the system to toggle back and forth between the configurations of FIGS. 5 and 6, whereby contraction of the motor lubricant 104 draws barrier fluid into the bottom of the motor housing 102 and pumped product into the inner barrier chamber 202, while expansion of the motor lubricant 104 expels the layer 500 of barrier fluid from the motor housing 102 back into the barrier chambers, and at least some of the liquid in the second layer 502 back into the third interconnection 208. The first layer 400 of motor lubricant 104 at the top of the outer barrier chamber 200 remains unchanged by this process.

It can be seen from the drawings, and especially from FIGS. 5 and 6, that the dual nested barrier chambers 200, 202, together with the locations where the interconnections 204, 206, 208 enter the barrier chambers 200, 202, prevent any of the pumped product 502 from entering the motor housing 102. Furthermore, except for the small amount of motor lubricant 104 that may enter the third interconnection 208 during the first startup (FIG. 4), no further motor lubricant 104 is brought into contact with the pumped product 502. After initial startup, therefore, the motor lubricant 104 remains fully isolated from the pumped product 502.

Figure 7:
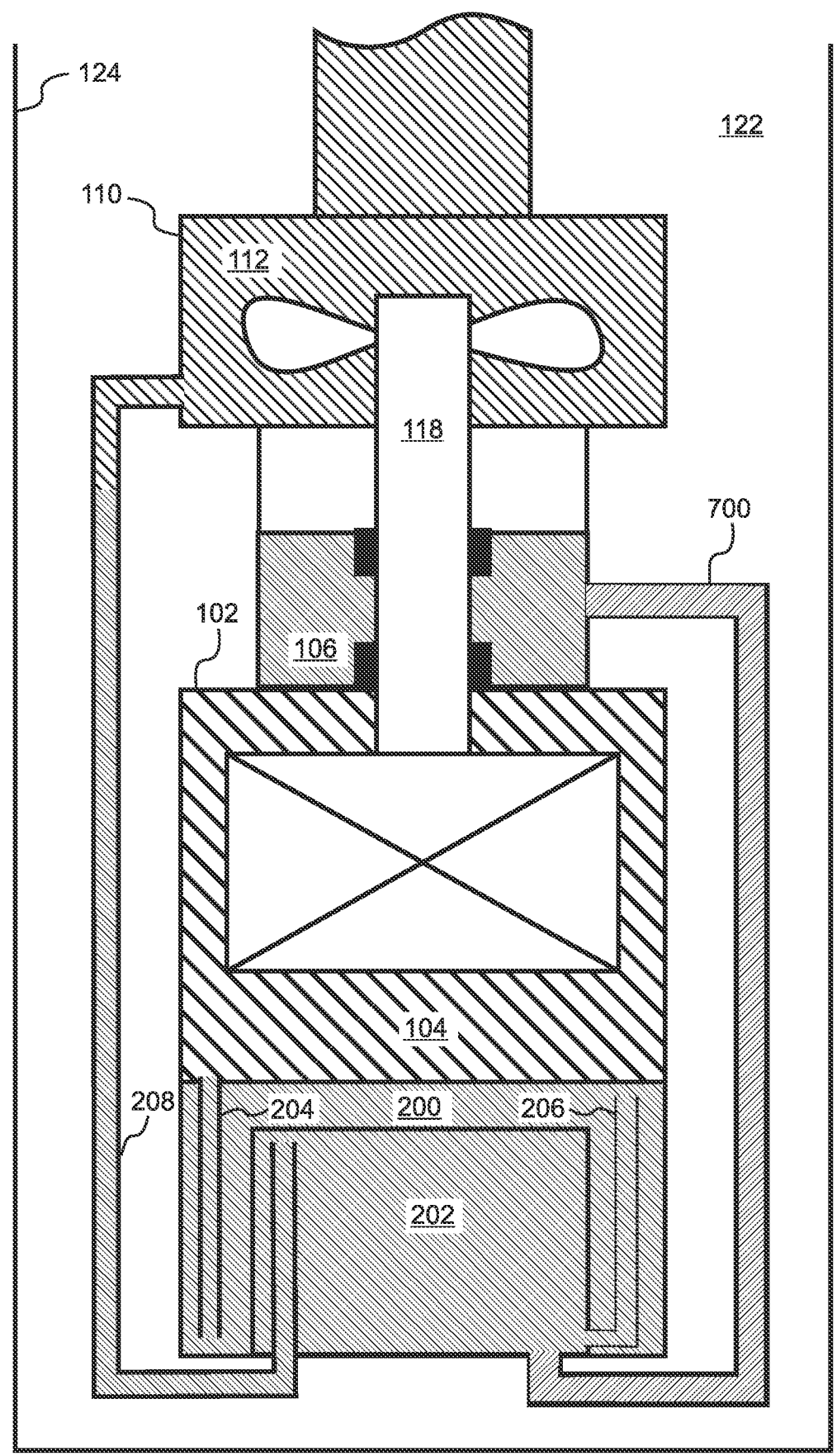
FIG. 7 is a cross-sectional side view of an ESP that includes a seal chamber filled with barrier fluid according to an embodiment of the present invention.

With reference to FIG. 7, in some embodiments the seal chamber 106 is also filled with barrier fluid, and a fourth interconnection 700 extends from the seal chamber 106 to the bottom of the inner barrier chamber 202, thereby maintaining the seal chamber 106 at the same pressure as the other chambers 102, 200, 202.

With reference to FIGS. 8A, 8B, and 8C, embodiments include a first interconnection valve 800 associated with the first interconnection 204. In the embodiment of FIGS. 8A-8C, the first interconnection valve 800 includes a first interconnection valve stem 802 extending downward from a first interconnection valve plug 804 beyond the lower end of the first interconnection 204 and out of the outer barrier chamber 200 through a first interconnection valve fitting 806. In FIG. 8B, the first interconnection valve 800 is closed, with the first interconnection valve plug 804 being pressed against a first interconnection valve seat 808 formed at the end of the first interconnection 204, thereby isolating the interior of the motor housing 102, which is filled with motor lubricant 104, from the barrier chambers 200, 202, which are initially empty in FIG. 8B. In similar embodiments, the barrier chambers 200, 202 may be filled with an oil during shipment, which can be drained out of the barrier chambers 200, 202 through closable vents (not shown) before filling of the barrier chambers 200, 202 with barrier fluid.

Once the barrier chambers 200, 202 have been filled with barrier fluid, the first interconnection valve 800 is opened, and remains open during operation of the ESP. In the embodiment of FIG. 8C, this is accomplished by attaching a covering cap 810 to the first interconnection valve fitting 806, which pushes the first interconnection valve stem 802 upward, and thereby maintains the first interconnection valve 800 in an open configuration, while also sealing the first interconnection valve fitting 806.

In embodiments such as FIG. 7 that include a fourth interconnection 700 between the seal chamber 106 and the inner barrier chamber 202, the seal chamber 106 is filled with barrier fluid together with the barrier chambers 200, 202.

It should be noted that the disclosed ESP is suitable for pumping any liquid pumped product while using any motor lubricant, so long as the barrier fluid is not miscible nor reactive with the pumped product or motor lubricant, and so long as the densities of the pumped product and of the motor lubricant are less than the density of the barrier fluid.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

We claim:

1. An electrical submerged pump (ESP) suitable for pumping a pumped product while isolating the pumped product from motor lubricant contained in a motor housing within the ESP, said isolating being without implementation of a bellows, diaphragm, or bladder, the ESP comprising:
- a pump comprising a pump impeller contained within a pump housing;
- an electrical motor;
- a motor housing surrounding the electrical motor, the motor housing containing a motor lubricant, a lower region of the motor housing extending below the electrical motor;
- a rotatable shaft extending from the electrical motor to the pump;
- a seal configured to prevent a pumped product from leaking into the motor housing along the rotatable shaft;
- a seal housing surrounding the seal;
- an outer barrier chamber located below the motor housing;
- an inner barrier chamber nested within the outer barrier chamber;
- an ESP housing surrounding the pump, the motor housing, and the barrier chambers;
- a first interconnection configured to enable liquid communication between the lower region of the motor housing and a lower region of the outer barrier chamber;
- a second interconnection configured to enable liquid communication between an upper region of the outer barrier chamber and a lower region of the inner barrier chamber;
- a third interconnection configured to provide liquid communication between an upper region of the inner barrier chamber and a product location within the ESP housing, the product location being filled with the pumped product; and
- a barrier fluid included within the outer and inner barrier chambers, the barrier fluid being immiscible and nonreactive with the motor lubricant and the pumped product, and having a barrier fluid density that is higher than a density of the motor lubricant and a density of the pumped product.

2. The ESP of claim 1, wherein the pumped product includes at least one hydrocarbon.

3. The ESP of claim 2, wherein the pumped product is crude oil.

4. The ESP of claim 1, wherein the pumped product is water.

5. The ESP of claim 4, wherein the pumped product is salt water.

6. The ESP of claim 1, wherein the seal chamber is filled with the barrier fluid, and wherein the ESP further comprises a fourth interconnection configured to provide fluid communication between the seal chamber and the lower region of the inner barrier chamber.

7. The ESP of claim 1, wherein the product location is an intake region of the pump housing.

8. The ESP of claim 1, wherein the product location is within the ESP housing, but exterior to the pump housing, seal housing, motor housing, and barrier chambers.

9. The ESP of claim 1, further comprising a first interconnection valve cooperative with the first interconnection and configured to be closed prior to installation of the ESP, and to remain open following the installation of the ESP.

10. A method of pumping a pumped product while isolating the pumped product from a motor lubricant contained in a motor housing, said isolating being without implementation of a bellows, diaphragm, or bladder, the method comprising:
- providing an ESP according to claim 1;
- filling the outer and inner barrier chambers with the barrier fluid;
- operating the motor, thereby causing the motor lubricant within the motor housing to expand, so that some of the motor lubricant is caused to enter the lower region of the outer barrier chamber through the first interconnection, and from thence to float to the upper region of the outer barrier chamber, said motor lubricant being further caused to enter the lower region of the inner barrier chamber through the second interconnection, and from thence to float to the upper region of the inner barrier chamber, said motor lubricant being further caused to enter the third interconnection;
- stopping the motor, thereby causing the motor lubricant in the motor housing to contract, so that some of the barrier fluid enters the lower region of the motor housing through the first interconnection, while at least one of motor lubricant and pumped product are caused to flow through the third interconnection and into the upper region of the inner barrier chamber; and
- restarting the motor, thereby causing the motor lubricant in the motor housing to expand, so that at least some of the barrier fluid that previously entered into the lower region of the motor housing is caused to flow through the first interconnection into the outer barrier chamber, while at least one of motor lubricant and barrier fluid are caused to enter the third interconnection from the inner barrier chamber.

11. The method of claim 10, wherein the ESP further includes a first interconnection valve cooperative with the first interconnection, and wherein the method further comprises:
- causing the first interconnection valve to be closed before filling the outer and inner buffer chambers with the barrier fluid, thereby maintaining the motor lubricant within the motor housing; and
- opening the first interconnection valve after filling the outer and inner buffer chambers with the barrier fluid, and before operating the motor.

12. The method of claim 10, wherein the ESP further comprises a fourth interconnection configured to provide fluid communication between the seal housing and the lower region of the inner barrier chamber, and the method further comprises filling the seal housing with the barrier fluid.

* * * * *